United States Patent
Cholleti et al.

(10) Patent No.: US 7,472,249 B2
(45) Date of Patent: Dec. 30, 2008

(54) KERNEL MEMORY FREE ALGORITHM

(75) Inventors: Udayakumar Cholleti, Cupertino, CA (US); Sean McEnroe, North Borough, MA (US); Stan J. Studzinski, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 159 days.

(21) Appl. No.: 11/479,750

(22) Filed: Jun. 30, 2006

(65) Prior Publication Data

US 2008/0005521 A1 Jan. 3, 2008

(51) Int. Cl.
- G06F 12/00 (2006.01)
- G06F 13/00 (2006.01)
- G06F 13/28 (2006.01)

(52) U.S. Cl. .................. 711/173; 711/170; 711/165
(58) Field of Classification Search ............... None
See application file for complete search history.

(56) References Cited

U.S. PATENT DOCUMENTS

| | | | |
|---|---|---|---|
| 4,787,031 A | 11/1988 | Karger et al. | |
| 4,961,134 A | 10/1990 | Crus et al. | |
| 5,440,746 A | 8/1995 | Lentz | |
| 5,577,231 A | 11/1996 | Scalzi et al. | |
| 5,659,798 A | 8/1997 | Blumrich et al. | |
| 6,052,699 A | 4/2000 | Huelsbergen et al. | |
| 6,349,355 B1 | 2/2002 | Draves et al. | |
| 6,622,226 B1 | 9/2003 | Dussud | |
| 6,922,765 B2 * | 7/2005 | Jacobs | 711/173 |
| 7,093,097 B2 * | 8/2006 | Herr et al. | 711/171 |
| 2005/0144422 A1 | 6/2005 | McAlpine et al. | |
| 2005/0240748 A1 | 10/2005 | Yoder | |
| 2006/0064562 A1 | 3/2006 | Mohideen et al. | |
| 2006/0107020 A1 | 5/2006 | Stillwell et al. | |
| 2006/0294165 A1 | 12/2006 | Bacon et al. | |
| 2007/0038891 A1 * | 2/2007 | Graham | 714/28 |
| 2007/0169024 A1 | 7/2007 | Drepper | |
| 2007/0288718 A1 | 12/2007 | Cholleti et al. | |
| 2008/0005495 A1 | 1/2008 | Lowe et al. | |

OTHER PUBLICATIONS

Rubini et al., Linux Device Driver, Jun. 2001, 2nd Edition, Ch 2 & 13.*
Hp a C++/HP C Programmers Guide, Sep. 2004, Editon 3.*

* cited by examiner

*Primary Examiner*—Reginald G Bragdon
*Assistant Examiner*—Baboucarr Faal
(74) *Attorney, Agent, or Firm*—Hickman Palermo Truong & Becker LLP (57) ABSTRACT

An approach for freeing memory based upon its relocatable or non-relocatable property is provided. In one embodiment, drivers and other processes that do not provide callback methods or similar capability to route DMA requests to the correct physical address are identified and all memory allocations made by the driver or other process are made from the appropriate region.

21 Claims, 4 Drawing Sheets

KERNEL MEMORY FREE ALGORITHM

RELATED APPLICATIONS

This application is related to: (1) co-pending non-provisional application Ser. No. 11/451,966, filed Jun. 12, 2006, entitled "PHYSICAL ADDRESS MAPPING FRAMEWORK," naming Udayakumar Cholleti, Sean McEnroe, and Stan J. Studzinski as inventors; (2) co-pending non-provisional application Ser. No. 11/452,768, filed Jun. 13, 2006, entitled "APPROACH FOR DE-FRAGMENTING PHYSICAL MEMORY BY GROUPING KERNEL PAGES TOGETHER BASED ON LARGE PAGES," naming Udayakumar Cholleti, Sean McEnroe, and Stan J. Studzinski as inventors; and (3) co-pending non-provisional application Ser. No. 11/479,664, filed Jun. 30, 2006, entitled "IDENTIFYING RELOCATABLE KERNEL MAPPINGS," naming Udayakumar Cholleti, Sean McEnroe, and Stan J. Studzinski as inventors; and (4) co-pending non-provisional application Ser. No. 11/451,751, filed Jun. 12, 2006, entitled "RELOCATING PAGE TABLES," naming Udayakumar Cholleti, Sean McEnroe, and Stan J. Studzinski as inventors. The entire disclosures of the above applications are hereby incorporated by reference for all purposes as if fully set forth herein.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Physical memory of a computing system is divided into allocation units called "pages." These pages are distributed amongst the several processes executing on a given system. Some pages are allocated to the kernel, and therefore such pages are referred to as kernel pages, while other pages are allocated to one or more user processes (e.g., applications), and therefore such pages are referred to as user pages. Each physical page is the same size in bytes. For example, in some computing systems, each physical page is 8 KB long. Each physical page has a unique page frame number (PFN). A physical page's PFN may be determined by dividing the starting physical memory address of that physical page by the page size. Thus, in a system in which each physical page contains 8192 bytes, the PFN of a physical page that contains physical memory addresses 0 through 8191 is 0, the PFN of a physical page that contains physical memory addresses 8192 through 16383 is 1, and the PFN of a physical page that contains physical memory address 16384 through 24575 is 2. When processes request memory, it is allocated in a multiple of physical pages.

In addition to physical memory, computing systems may use virtual memory (VM) and a Virtual Memory Subsystem (hereinafter "VMS") as part of managing allocation of the system's physical memory. VM uses slower storage media (usually disk) to store data that does not fit within the physical memory of the system. This enables programs larger than the size of physical memory to execute. The VMS optimally keeps frequently used portions of memory within physical memory and the lesser-used portions on the slower secondary storage.

The VMS provides a virtual view of memory, known as an address space, while the VMS transparently manages the virtual storage between RAM and secondary storage. In many computing systems that employ a virtual memory management scheme, virtual memory address space is segregated into "user" virtual memory address space and "kernel" virtual memory address space. Each executing user process has its own virtual memory address space allocated within the user virtual memory address space. The system kernel has its own kernel virtual memory address space. Physical pages of memory are mapped onto these address spaces. Some physical pages are mapped into the user virtual memory address space, and some physical pages are mapped into the kernel virtual memory address space. Inasmuch as multiple user processes may share the same data, some of the virtual memory address space of each of two or more user processes may be mapped to the same physical pages. In fact, a physical page that is mapped to user virtual memory address space may be concurrently mapped to kernel virtual memory address space, at least temporarily.

Each physical-to-virtual page mapping may have a corresponding entry in a Translation Lookaside Buffer (TLB), which is typically implemented in hardware. Usually, when a process attempts to access data at a particular virtual address, it invokes the VMS. The VMS first attempts to find the relevant virtual-to-physical page mapping in the TLB, using the virtual address as a key. If the VMS cannot find a relevant, valid mapping in the TLB (a circumstance called a "TLB miss"), then the VMS attempts to find a relevant, valid mapping in a Translation Storage Buffer (TSB), which is similar in structure to the TLB, but larger and slower, and typically implemented in software. If the VMS cannot find a relevant, valid mapping in the TSB (a circumstance called a "TSB miss"), then the VMS attempts to find a relevant, valid mapping in "page tables," which are implemented as hash tables. If the VMS cannot find a relevant, valid mapping in the page tables (a circumstance called a "page fault"), then the VMS invokes a mechanism called the "page fault handler." The page fault handler locates a relevant, valid mapping using information within kernel internal tables, which may refer to persistent storage. Significantly, the kernel internal tables are stored in physical pages that are mapped to the kernel virtual memory address space.

A computing system may comprise multiple system boards. Each system board may comprise one or more CPUs and some physical memory. Each system board has a different range of physical memory addresses that do not overlap with any other system board's range of physical memory addresses.

Sometimes, a particular system board may be experiencing errors. Under such circumstances, it may be desirable to remove that system board from the computing system.

A large computing system may be logically divided into multiple separate domains. Each domain may be allocated one or more system boards. Each domain may be used by a different group of users for different purposes. For example, one domain might be used to run a web server. Another domain might be used to run a database.

At some point in time, it may become desirable to change the allocation of system boards to domains. Under some circumstances, it might be desirable to change the allocation on a regular basis (e.g., daily), automatically and dynamically. It is better for such reallocation to be performed with minimum disruption to the computing system and the processes executing thereon. For example, it is better for such reallocation to be performed without shutting down and rebooting the entire computing system, because rebooting the entire computing system can be a relatively time-consuming process. Usually, user processes cannot execute during much of the time that a computing system is rebooting.

Whenever a system board is going to be removed from a computing system, or whenever a system board is going to be allocated to a different domain, the data stored in that system board's physical pages needs to be relocated to the physical pages of another system board. Relocation involves moving the data that is stored in one set of physical pages to another set of physical pages.

In the case of user physical pages and user virtual address space, this relocation may be readily accomplished. In these cases, virtual to physical mapping to the physical page is unloaded and the physical page is relocated to another page, and the virtual address of that physical page is simply revised to point to the new physical page address; when a process accesses the user virtual address, it will page fault and load the new mapping. The virtual address remains the same and the physical address changes. In the case of kernel pages and kernel virtual address space, however, special care must be taken.

According to current approaches, a page fault handler is not invoked in response to a page fault that involves a mapping of a physical page to the kernel virtual memory address space. This is because the kernel internal tables that contain the mapping for which the page fault handler would be searching are stored in a physical page that is, itself, mapped to the kernel virtual memory address space. If the contents of that physical page were currently being relocated, then the virtual memory subsystem would not be able to locate a valid virtual-to-physical page mapping for that physical page in the TLB, the TSB, or the page tables; all of the entries containing that mapping would have been invalidated due to the relocation. An unending recursive cascade of page faults and page fault handler invocations would likely result, overflowing the kernel stack and causing the entire computing system to fail.

Consequently, under current approaches, all of the kernel pages are confined to a limited subset of all of the system boards in a computing system, to compensate for the possibility that one or more of the system boards in that subset might be replaced at some point in time. Kernel physical pages are non-relocatable under current approaches. Optimally, they are allocated contiguously on the limited subset of boards, because it makes the process of removing system boards easier. If kernel allocations exist on all boards, those allocations cannot be moved and the boards cannot be removed.

This confinement of kernel pages to a limited subset of all of the system boards has some negative consequences. Thousands of user processes might be concurrently executing on various system boards. At any given moment, many of these user processes may cause accesses to the kernel pages (e.g., as a result of page faults). Because all of the kernel pages are located on the same limited subset of system boards under current approaches, the input/output resources of the system boards in the limited subset are often subject to heavy system bus contention. The overall performance of the entire computing system may be degraded as a result of system bus contention.

Under approaches such as those disclosed in the Related Applications, kernel pages may be relocated in a manner similar to techniques used for relocating the contents of user pages. This relocation can cause negative consequences in certain circumstances. For example, certain device drivers may seek to access memory directly, a technique known as Direct Memory Access (DMA). DMA is a technique for transferring data from main memory to a device without passing it through the CPU. Computers that have DMA channels can transfer data to and from devices much more quickly than computers without a DMA channel. This is useful for making quick backups and for real-time applications. Some expansion boards, such as CD-ROM cards, are capable of accessing the computer's DMA channel.

These drivers may allocate kernel pages, for example to perform data transfer. Kernel pages may be either solely accessed by virtual addresses or accessed by both virtual addresses and physical addresses. If the kernel pages are accessed solely by virtual addresses, the VMS will intercept DMA requests to those pages and redirect the request to the appropriate location. If the kernel pages are accessed by physical addresses, and the kernel pages have been relocated or freed, the DMA request will access the wrong physical address, with the result being data corruption or the cascade of page faults as described earlier.

In order to more accurately and efficiently relocate and free memory, and thereby enhance overall computing system performance, techniques are needed for allowing the identification of memory as relocatable or non-relocatable and acting on the resulting identification.

SUMMARY

An approach for partitioning virtual memory address space and identifying relocatable and non-relocatable regions of memory is provided. In one embodiment, the allocations of physical addresses and kernel virtual memory addresses are partitioned into relocatable and non-relocatable regions such that, by inspecting a virtual address, the property of the physical memory (relocatable or non-relocatable) is identified.

According to another embodiment, a request to free memory results in a determination of whether the virtual address associated with the request is located in relocatable or non-relocatable virtual address space, and based on the location, the underlying physical memory is freed to its respective partition. According to another embodiment, a request to allocate relocatable physical memory results in an allocation of non-relocatable physical memory and an allocation of relocatable virtual address space, and in response to a request to relocate the allocation, it is determined whether whether the allocation can be relocated or freed based upon a virtual address. According to an embodiment, there may exist some pages in kernel cage space that correspond to relocatable kernel allocations. Such allocations are identified so that they may be relocated to outside of the kernel cage when a need exists to increase the number of free pages in the kernel cage. Otherwise, the kernel cage may expand further and ultimately encompass all the system boards, making it impossible to relocate any system board.

Further, an approach for freeing memory based upon its relocatable or non-relocatable property is provided. In one embodiment, drivers and other processes that do not provide callback methods or similar capability to route DMA requests to the correct physical address are identified and all memory allocations made by the driver or other process are made from the appropriate region.

According to another embodiment, a listing of "non-conforming" modules, such as device drivers, is maintained and checked during startup. While this application will discuss the use of device drivers, it should be understood that the techniques are applicable to any process executing on a computer. For each non-conforming driver identified, the driver's binaries are scanned for calls to a kmem_alloc( ) function or similar function that allocates memory. These calls are replaced, in one embodiment by changing the symbol table, with calls to a function such as kmem_cage_alloc( ) or a similar function that allocates virtual address(es) and physical address(es) from the non-relocatable portions of the respective memory allocations. According to another embodiment, all calls made to kmem_free( ) by the non-conforming drivers are replaced with calls to a function such as kmem_cage_free( ) or a similar function that frees the memory from the relocatable or non-relocatable portion based on the virtual address passed as a parameter in the function call. According to another embodiment, kmem_cage_free( ) is a wrapper function that calls kmem_free( ) or a similar function that frees the memory from the relocatable or non-relocatable portion based on the virtual address passed as a parameter in the function call.

In one embodiment, the user and kernel share the same virtual address space, and in response to a request to allocate or relocate memory, a flag or similar identifer is added to the memory page structure to identify the request that resulted in the allocation of memory as a request for relocatable or non-relocatable memory. In one embodiment, a page freelist is maintained for relocatable and non-relocatable memory, and in response to a request for relocatable memory, a portion of memory is extracted from the non-relocatable freelist and a flag is set identifying the memory portion as being relocatable. A request for non-relocatable memory request is fulfilled by allocating a page from the non-relocatable page freelist. A request for relocatable memory may be fulfilled by allocating either a page from the relocatable page free list (preferably) or the non-relocatable page freelist (if the relocatable page freelist is empty)

According to other aspects, the invention encompasses a machine-readable medium, a carrier wave, an apparatus, and a system configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

A method and apparatus for identifying and freeing memory is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Partitioning Memory Into Relocatable And Non-Relocatable Portions

As was discussed above, in one embodiment of the invention, the physical memory address space and kernel virtual memory address space are logically partitioned into relocatable and non-relocatable regions.

Figure 1:
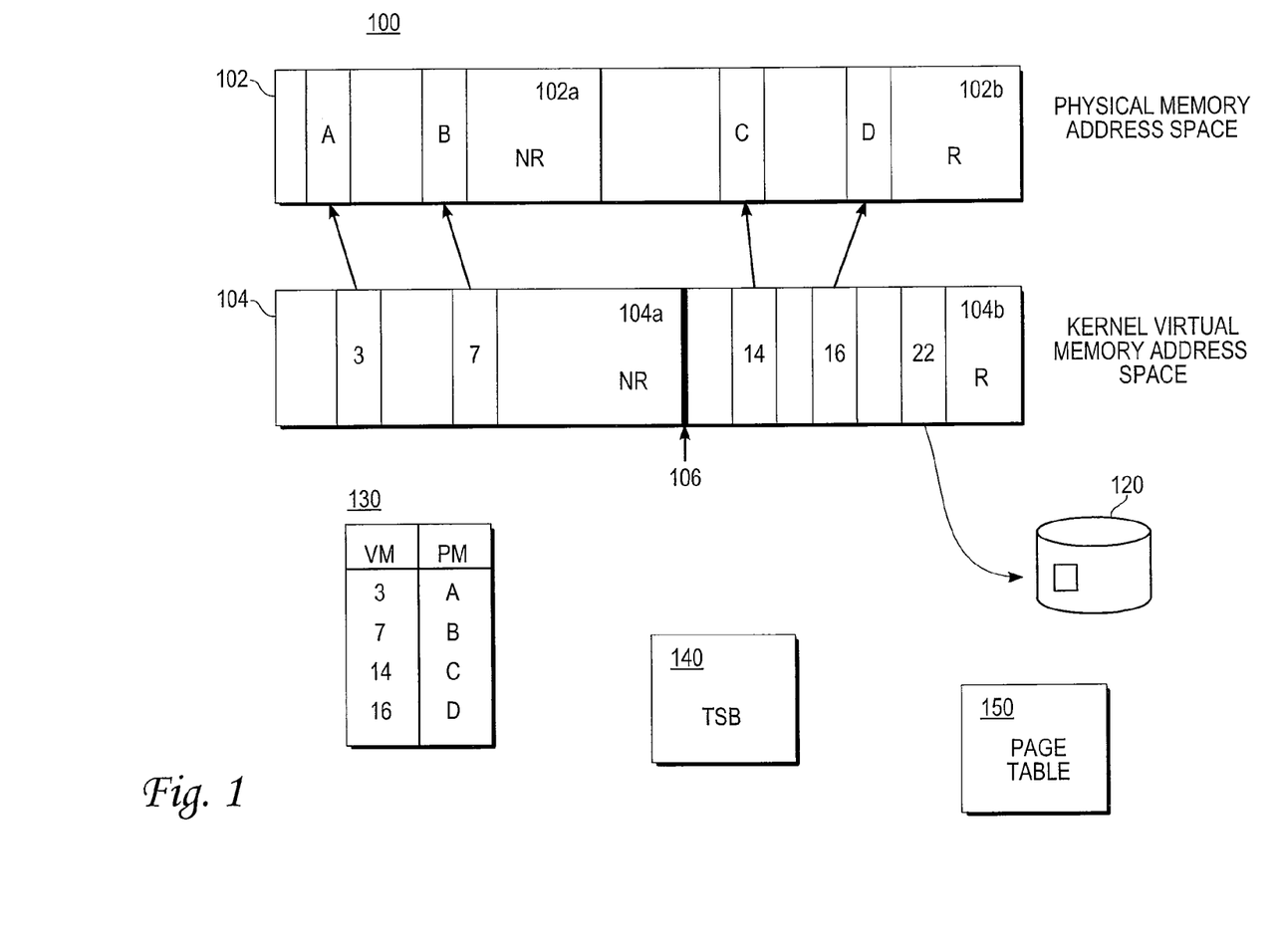
FIG. 1 is a block diagram 100 that illustrates an example of a logical partitioning of physical memory and kernel virtual memory address space, according to an embodiment of the invention.

FIG. 1 is a block diagram 100 that illustrates an example of a logical partitioning of physical memory and kernel virtual memory address space, along with a simplified example of a Translation Lookaside Buffer, a Translation Storage Buffer, and a Page Table according to an embodiment of the invention.

FIG. 1 shows a physical memory 102 logically divided into non-relocatable memory 102a and relocatable memory 102b. Each said portion is comprised of pages, and four are specifically identified in FIG. 1. Pages A and B are located in non-relocatable physical memory 102a, and pages C and D are located in relocatable physical memory 102b. In FIG. 1, a kernel virtual memory address space 104 is shown. This kernel virtual memory address space 104 is logically divided into non-relocatable address space 104a and relocatable address space 104b. According to an embodiment, the point at which the logical division occurs is called the base 106. All addresses are numbered, and the base 106 may be a number. The base is initialized at boot during the initialization of the kernel virtual memory address space. The base is a kernel variable and is stored like a normal global kernel variable. The VMS may access the base and perform a determination regarding whether a kernel virtual address falls into relocatable or non-relocatable kernel virtual address space.

According to an embodiment, all address numbers less than or equal to the base are identified as being in non-relocatable kernel virtual address space and all address numbers greater than the base are identified as being in relocatable kernel virtual address space. An embodiment is envisioned where all address numbers less than the base are identified as being in non-relocatable address space and all address numbers greater than or equal to the base are identified as being in relocatable address space.

According to an embodiment, non-relocatable virtual memory addresses map to physical pages in non-relocatable physical memory and relocatable virtual memory addresses map to physical pages in relocatable physical memory or non-relocatable physical memory if no relocatable memory is available. Given a particular virtual memory address, the VMS can determine whether it falls into non-relocatable virtual memory address space or relocatable virtual memory address space, and therefore can determine whether the underlying physical memory is relocatable or non-relocatable.

In FIG. 1, the kernel virtual memory address space 104 has five addresses identified. Addresses 3 and 7 are in non-relocatable virtual address space. This is confirmed by querying whether the address number is less than or equal to the base 106, which in FIG. 1 is 10. Address space 3 is mapped to physical page A. Address space 7 is mapped to physical page B. Therefore, it may be determined that physical pages A and B are non-relocatable. Addresses 14 and 16 are in relocatable virtual address space. This is confirmed by querying whether the address number is greater than the base 106. Address space 14 is mapped to physical page C. Address space 16 is mapped to physical page D. Therefore, it may be determined that physical pages C and D are relocatable. Address space 22 is mapped to a page stored on disk 120.

These mappings are stored in a TLB 130. With hardware support for virtual memory, virtual addresses are looked up within the TLB 130. The TLB 130 is specifically designed to perform this lookup in parallel, so this process is extremely fast. If there is a match for a page within the TLB 130 (a TLB hit), the physical page number is retrieved and the memory access can continue. However, if there is no match (called a TLB miss), the second port-of-call is the TSB 140 if one is available. If a mapping were not available in the TSB 140, the system would page fault to the page table 150.

Non-Conforming Drivers and Memory Allocation Techniques

Despite the techniques disclosed by the Related Applications, some kernel pages are not relocatable because certain device drivers and other processes may not provide functionality, such as callback handlers, that allow for DMA despite the potential relocation of the target page. Memory allocations for non-conforming drivers must be "caged" or allocated from non-relocatable memory. While this application will discuss the use of device drivers, it should be understood that the techniques are applicable to any process executing on a computer.

"Conforming" device drivers provide "callback handlers." A callback is a method signature that is defined by a resource, like a control, where the client must provide the method implementation. A callback may be thought of as an event that is responded to using a callback handler. According to an embodiment, a callback handler is a method registered with the VMS by a device driver. The VMS uses the callback handler to notify the driver when the physical address associated with a virtual address being used by the driver is being changed. For example, the VMS may notify a driver to stop accessing a particular physical page. The VMS then relocates the physical page and updates the virtual address to point to the new location of the physical page. The VMS then notifies the driver of the new address and alerts the driver that it may now resume accessing the physical page. Through these techniques, a device driver can use relocatable memory for DMA, because all calls to the physical address are intercepted by the VMS and the driver is notified of events as described above.

According to an embodiment, conforming drivers call a kmem_alloc( ) method to allocate memory and a kmem_free( ) method to free allocated memory. While the methods may operate under differing names based on the particular system, the underlying operation is consistent. kmem_alloc( ) is a public interface that allocates relocatable memory. The memory allocated by this method may be relocated, because the virtual memory subsystem works with the callback handlers to provide the correct physical address for DMA as discussed above.

According to an embodiment, a list of conforming drivers is stored in a file accessible to the kernel during boot. According to an embodiment, this file may be stored on the boot file system in a directory known to the module loader along with other boot configuration files and may comprise an ASCII text file.

During boot, as each driver is loaded, the list of conforming drivers is checked by the driver loader to verify that the currently-loading driver is in the list. If the currently-loading driver is not in the list, the driver's binary is scanned for calls to kmem_alloc( ). Each call to kmem_alloc( ) is changed to a call to kmem_cage_alloc( ), and each call to kmem_free( ) is changed to kmem_cage_free( ). These changes may be transient in nature. According to an embodiment, this change may be accomplished by changing the calls in the associated symbol table. Each driver has a corresponding symbol table in its object file. These tables may be kept in memory and stored in persistent storage, depending on the implementation. When a driver is loaded, the corresponding symbol table is constructed and stored in memory along with the driver, in some cases in a separate section inside the driver executable. A symbol table is an information base that contains information about the declaration, definition and use of named program elements such as classes, methods, variables and functions. In the symbol table for a driver, each method, such as kmem_alloc( ), is associated with an address space where the instructions to be carried out by the method are stored.

According to an embodiment, the symbol table for all non-conforming drivers is changed so calls to kmem_alloc( ) are changed to calls to kmem_cage_alloc( ); this translation is transparent to the user. kmem_cage_alloc( ) is identical to kmem_alloc( ), except it allocates a virtual address and a physical address from the non-relocatable region of the respective memory addresses. kmem_free_alloc( ) is a wrapper function for kmem_free( ).

An example of a situation where a driver allocates memory and performs DMA functions on the allocated memory would be network functions. For example, a conforming driver makes a request to allocate memory by calling kmem_alloc( ). The kmem_alloc( ) method allocates the memory and returns the addresses of the allocated memory. The addresses returned by kmem_alloc( ) are relocatable kernel virtual address. The kernel virtual addresses are associated with physical pages in the relocatable physical memory address space by the TLB, TSB, and page tables. After the memory is allocated, the conforming network driver makes a request to perform a network input/ouput operation and provides the allocated memory addresses. The driver enqueues the request into a global streams queue that is processed by a kernel module. The kernel initiates the I/O, using the memory addresses. Once the I/O completes, the kernel is responsible for freeing the allocated memory.

An example of a non-conforming driver performing the same functions is quite different. Because the non-conforming driver's calls to kmem_alloc( ) and kmem_free( ) were substituted with calls to kmem_cage_alloc( ) and kmem_cage_free( ), the non-conforming driver's call to allocate memory results in the allocation of a kernel virtual address and a physical address, both from the non-relocatable region. This allows for DMA functions.

A problem arises when the kernel or a conforming driver attempts to free the memory allocation made by the non-conforming driver, because the kernel or conforming driver has no way of knowing that the original memory allocation was from the non-relocatable region. Because the kernel will assume that the kernel virtual address allocated for the driver came from the relocatable region, it will attempt to free the virtual address to the relocatable region. Because the address cannot be found in that section, due to it having been allocated from the non-relocatable region, the kernel suffers a panic. The kernel panics when it finds inconsistency between kernel data structures or when it thinks they are corrupted.

According to an embodiment, upon receiving a call to kmem_cage_free( ) or kmem_free( ), the kernel checks the virtual address to see if it falls in the non-relocatable or relocatable region. This may be accomplished by evaluating the virtual address against the base, as described earlier. By determining which region the virtual address falls into, the kernel may free the memory from the non-relocatable or relocatable portion depending on the virtual address.

Figure 2:
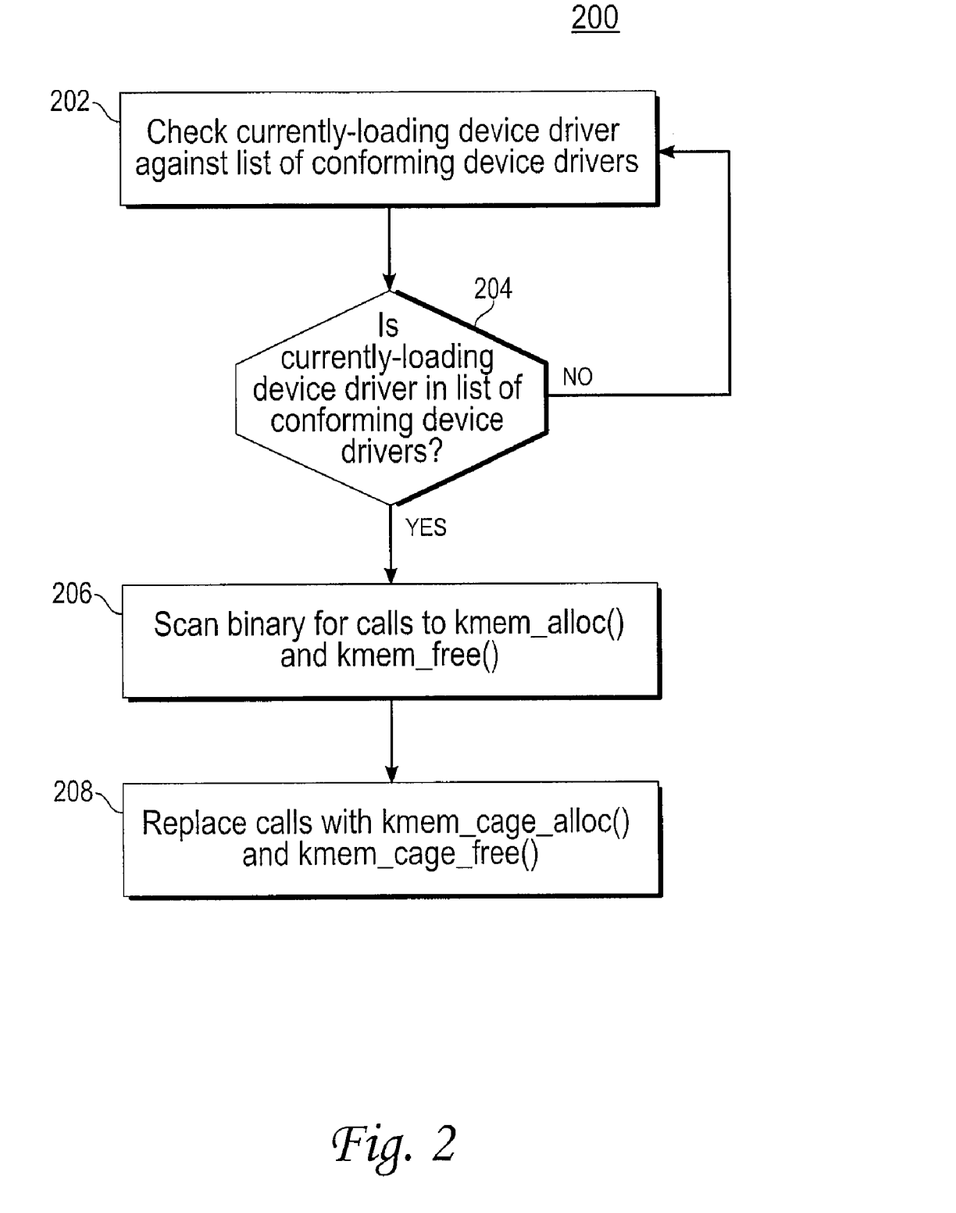
FIG. 2 is a flow diagram that illustrates an example wherein non-conforming device drivers are identified and appropriate memory allocation methods are utilized, according to an embodiment of the invention.

FIG. 2 is a flow diagram 200 that illustrates an example of an embodiment of the invention wherein non-conforming device drivers are identified and appropriate memory allocation methods are utilized. In block 202, the currently-loading device driver is checked against a list of conforming device drivers. Conforming device drivers have callback functionality whereby the kernel and/or the VMS can notify the driver that physical memory addresses being used by the driver are about to change. The driver is alerted to stop DMA until the underlying physical pages are relocated. Once the relocation is complete, the driver is notified of the new addresses and is allowed to resume DMA.

In block 204, if the driver is found in the list, control passes back to block 202 so the next-loaded driver can be checked. Otherwise, in block 206, the device driver's binary is scanned for calls to methods such as kmem_alloc( ) and kmem_free( ). In block 208, these calls are changed, for example by changing the symbol table for the driver, to calls to methods such as kmem_cage_alloc( ) and kmem_cage_free( ).

Allocation of Relocatable Memory from Non-Relocatable Region and Cage Expansion

According to an embodiment, memory may be allocated from non-relocatable physical memory and relocated to relocatable physical memory if the need arises. For example, a conforming driver may make an allocation request for relocatable memory using kmem_alloc( ), but there may not be any relocatable memory space available. Therefore, physical memory is allocated from the non-relocatable region of physical memory, but the virtual address(es) is (are) allocated from the relocatable portion of kernel virtual memory address space. After the allocation is made, a non-conforming driver may use kmem_cage_alloc( ) to request an allocation of non-relocatable memory. At this point, there now may be an excess of relocatable memory and a deficit of non-relocatable memory, such that the request can not be granted without clearing space in the non-relocatable region.

Another example involves the situation where there are many requests for memory allocations. There are two pools of available physical memory: a listing (freelist) of free relocatable pages and a listing of free non-relocatable pages. At a point in time, there may be no available free pages in relocatable physical memory to satisfy a request for relocatable memory, but there are available non-relocatable pages; therefore, pages from the non-relocatable freelist are allocated to the request, but the associated kernel virtual address is allocated from the relocatable kernel virtual address space. At some future time, the situation may have changed. There may be available pages in the relocatable freelist, but no pages available in the non-relocatable freelist. Prior to, or in response to, a request for non-relocatable physical memory, a process such as a "cageout daemon" scans pages in non-relocatable physical memory to identify its corresponding virtual address. This may be performed using reverse mapping or a similar technique.

Once the virtual address is obtained, it is checked against the base as described above. If the virtual address falls in relocatable kernel address space, the physical memory is relocatable despite its presence in non-relocatable memory.

Once the kernel (or VMS, depending on the implementation) verifies that the virtual address is located in the relocatable region, the kernel may safely relocate the physical memory and update the VMS to reflect the change. This frees non-relocatable pages for use, such as a non-conforming driver using the freed pages to allocate non-relocatable memory so that DMA activities carried out by the non-conforming driver are safe.

The technique to allocate requests for relocatable memory from non-relocatable memory, and relocate them if necessary, offers a solution to "cage expansion," which occurs when the non-relocatable portion of memory (the "cage") grows. Cage expansion hinders removal of system boards and system performance may deteriorate as it becomes harder to allocate relocatable pages. This growth occurs for various reasons; for example, a spike in network activity may cause a large increase in the amount of allocation requests for non-relocatable memory. If the non-relocatable freelist is empty, portions of the relocatable freelist must be used to satisfy the request. In response, the boundary between non-relocatable and relocatable memory shifts to accommodate the growth of non-relocatable memory and the corresponding shrink of relocatable memory.

Prior to the disclosed techniques, non-relocatable pages could not be identified as actually being relocatable through being associated with relocatable virtual addresses. In some instances, the cage expansion could extend to multiple system boards, resulting in a negative effect on system performance as described above.

Figure 3:
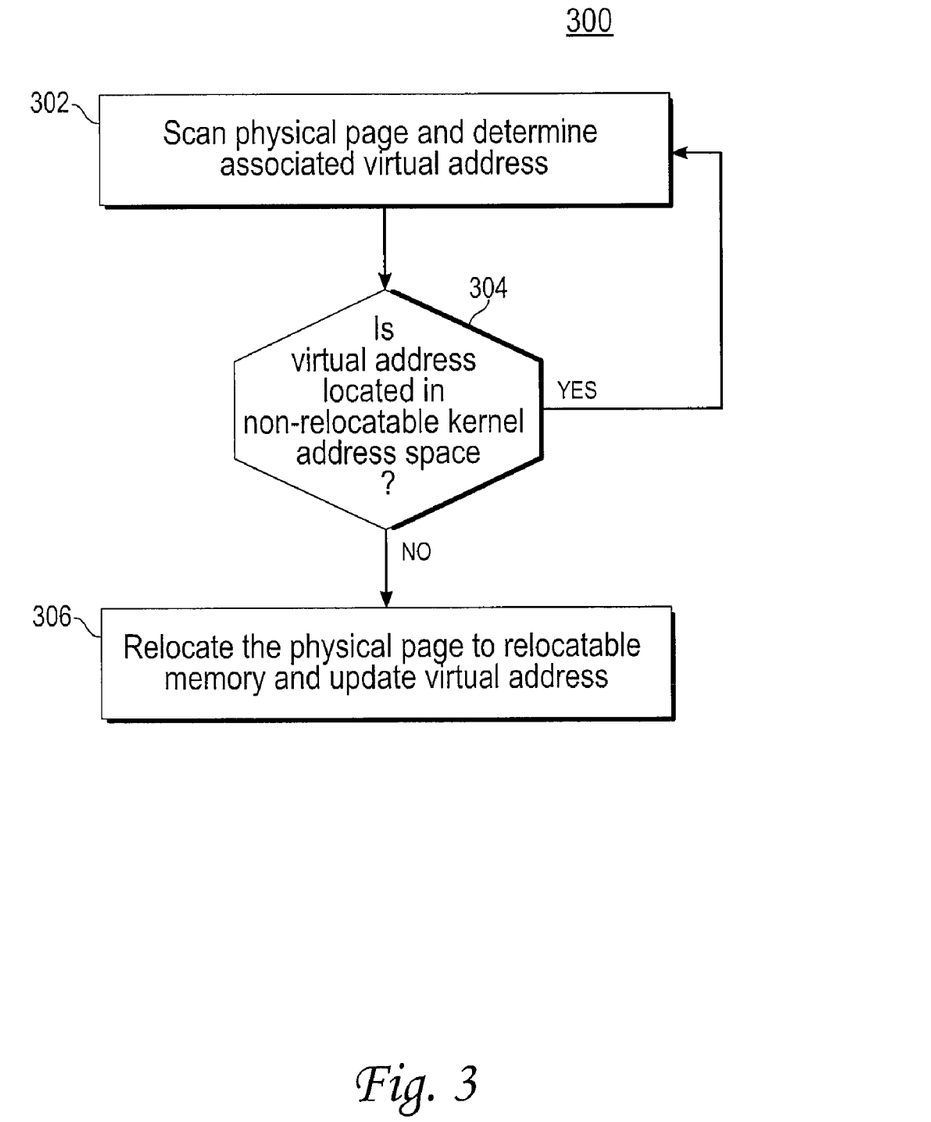
FIG. 3 is a flow diagram that illustrates an example wherein non-relocatable pages are identified as being relocatable, according to an embodiment of the invention.

FIG. 3 is a flow diagram 300 that illustrates an example of an embodiment of the invention wherein non-relocatable pages are identified as being relocatable. In block 302, a process such as a cageout daemon scans a physical page of non-relocatable memory and determines its corresponding virtual address, if one exists, using techniques such as reverse mapping. In block 304, the identified virtual address is compared to the base in kernel virtual address space. If the virtual address is determined to be located in non-relocatable kernel virtual address space, control passes back to block 302 so the cageout daemon can scan the next page. Otherwise, if the virtual address is determined to be located in relocatable kernel virtual address space, control passes to block 306 where the kernel or VMS relocates the physical page into relocatable memory and updates the virtual address to point to the new page location. Control passes back to block 302 where the next page is scanned.

Sharing of User Address Space and Kernel Address Space

The above techniques address the partitioning of physical and virtual memory in a system wherein the user address space and kernel address space are separate and can use the same virtual address in their respective virtual address spaces. In some systems, such as the X86 processor family, it is common for the user and kernel to share the same address space. This presents difficulty in managing kernel virtual address space, because the same stack of addresses are shared with user address space and therefore there is less room for non-relocatable allocations.

In systems where the user address space and kernel address space are separate and can use the same virtual address in their respective virtual address spaces, such as the SPARC processor family, a large non-relocatable region of kernel address space does not adversely affect user address space, because the same virtual address can be used. The expansion of non-relocatable kernel virtual memory addresses does not reduce the allocations available for user requests. The opposite may be true in some processor families, such as the X86.

The address space in these situations must be partitioned at boot time because the allocation cannot be changed. It is desirable to partition the non-relocatable portion of virtual address space as large as may be needed for all allocations made by non-conforming drivers; as a result, there may be a large amount of non-relocatable memory that is unused at any given time. Instead of letting this non-relocatable address space go unused, a technique is provided to allocate a relocatable request in non-relocatable address space and relocate that allocation if the need arises: for example, a spike in network I/O for a non-conforming driver may occur, increasing the need for non-relocatable allocations and requiring the relocatable allocation to be moved.

According to an embodiment, this may be accomplished by adding a flag to the page structure of the allocated page indicating that the page was allocated as the result of a request for relocatable memory. A linked list of free pages is maintained for relocatable and non-relocatable memory. When a relocatable request is made, free pages are allocated from the non-relocatable list in response. For all these pages, a bit is set indicating that the request was relocatable. For example, this bit may take the form of a P_RELOC flag, where P_RELOC is set to one for a relocatable request and to zero for a non-relocatable request.

In the embodiment, the page is allocated from the non-relocatable freelist and the flag is set to alert the system that it is actually a relocatable request temporarily using non-relocatable space. When the non-relocatable portion of memory begins to fill up, a pageout scanner daemon scans the pages in the non-relocatable portion looking for the flag that indicates a relocatable request. When pages with the correct flag are found, they are moved to relocatable memory space and the flag is set to the correct setting. According to other embodiments, the techniques described above pertaining to comparing a virtual address to the base are used to locate relocatable portions of memory.

IMPLEMENTATION MECHANISMS

The approaches described herein may be implemented in a variety of ways and the invention is not limited to any particular implementation. The approach may be integrated into a system or a device, or may be implemented as a stand-alone mechanism. Furthermore, the approach may be implemented in computer software, hardware, or a combination thereof.

Figure 4:
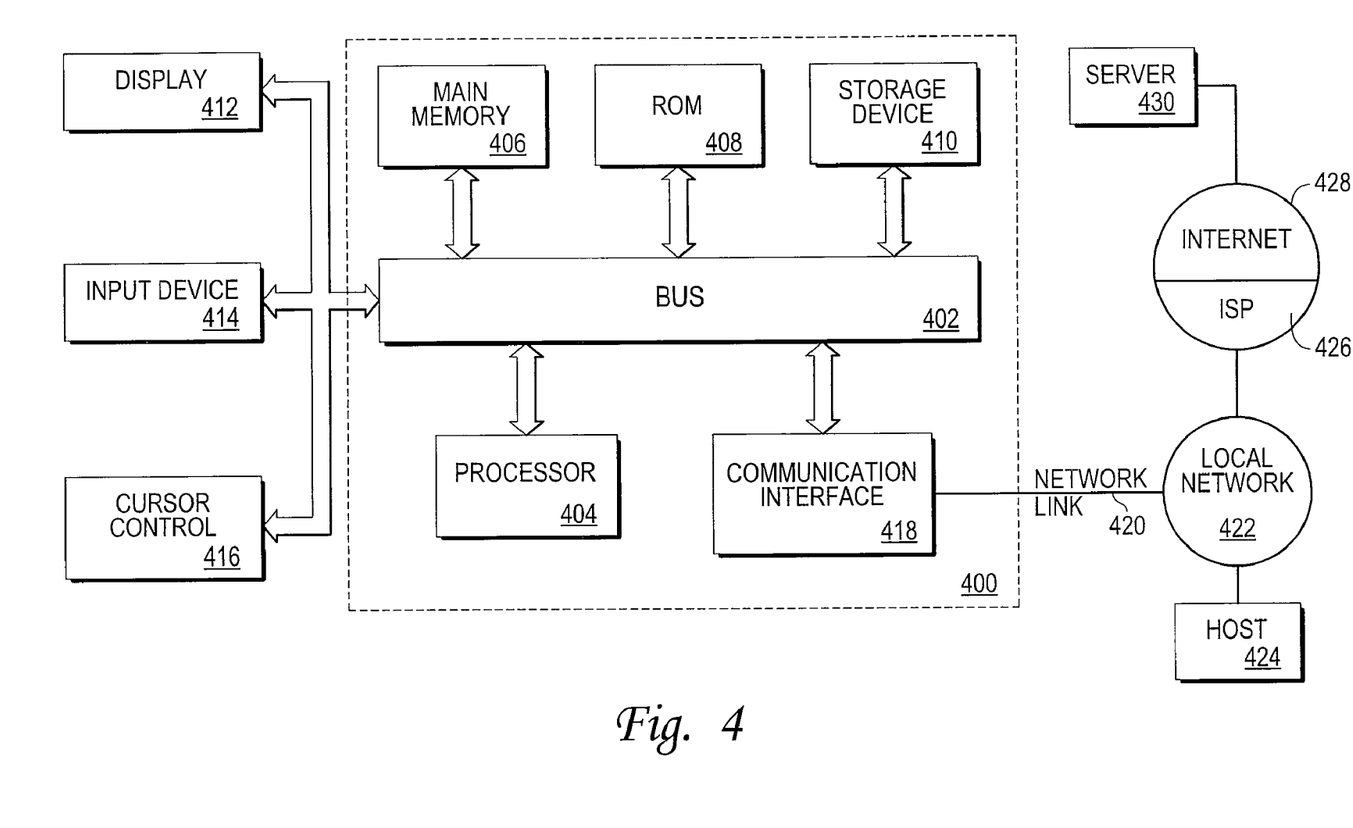
FIG. 4 is a block diagram that depicts a computer system upon which embodiments of the invention may be implemented.

FIG. 4 is a block diagram that depicts a computer system 400 upon which an embodiment may be implemented. According to an embodiment, the techniques described are implemented by an operating system kernel and the operating system may be executed on a computer. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing description, the invention has been described with reference to specific embodiments thereof. It will, however, be evident that various modifications and changes may be made thereto without departing from the broader spirit and scope of the invention. For example, although examples have depicted the use of a kmem_alloc( ) method to allocate memory, the kmem_alloc( ) method is used for explanation purposes only as embodiments of the invention are not limited to any particular type of manner of marking pages as kernel pages. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

Finally, several particular variations of the techniques described above are briefly enumerated in the following subsections. However, the following serve as examples of the types of different implementations and variations of the techniques described herein, and other variations or changes other than those described below may be employed in particular implementations.

What is claimed is:

1. A machine-implemented method for memory management, the method comprising:
    logically partitioning physical memory and kernel virtual memory address space of a computer system into relocatable and non-relocatable regions;
    for each driver of a plurality of drivers being loaded into the computer system, performing particular steps comprising:
        (a) determining whether the driver is located in a list; and
        (b) if the driver is located in the list, scanning a binary file of the driver and modifying method calls of the binary file of the driver such that all physical memory allocated for use by the driver is allocated from the non-relocatable regions;
    in response to a request to free the physical memory allocated for use by a particular driver of the plurality of drivers, performing particular steps comprising:
        (c) determining which kind of region a particular virtual address associated with the physical memory references in the kernel virtual memory address space, wherein said kind is either relocatable or non-relocatable; and
        (d) freeing said allocated physical memory from the appropriate region based upon the kind.

2. The machine-implemented method of claim 1, wherein the list comprises data accessed by a kernel during startup of the computer system.

3. The machine-implemented method of claim 1, wherein the step of scanning a binary file of the driver and modifying method calls of the binary file of the driver comprises:
    identifying a first method used by the driver that causes relocatable physical memory to be allocated;
    in response to the first method being called, causing the call to be redirected to a second method, wherein the second method causes non-relocatable physical memory to be allocated.

4. The machine-implemented method of claim 3, wherein the step of causing the call to be redirected to a second method comprises replacing references to the first method in a symbol table accessed by the kernel.

5. The machine-implemented method of claim 3, wherein the step of causing the call to be redirected to a second method comprises changing a first memory address associated with the first method to a second memory address associated with the second method.

6. The machine-implemented method of claim 1, wherein the method calls are associated with callback handlers.

7. The machine-implemented method of claim 1, wherein the step of determining which kind of region a particular virtual address associated with the physical memory references in the kernel virtual memory address space comprises:
    comparing the particular virtual address with a first value, wherein the first value is initialized at startup and is accessed by the kernel;
    based on the comparison, identifying the particular virtual address as referencing the relocatable or non-relocatable region of kernel virtual memory address space.

8. A machine readable storage medium comprising:
    instructions for causing one or more processors to logically partition physical memory and kernel virtual memory address space of a computer system into relocatable and non-relocatable regions;
    for each driver of a plurality of drivers being loaded into the computer system, instructions for causing one or more processors to perform particular steps comprising:
        (a) determining whether the driver is located in a list; and
        (b) if the driver is located in the list, scanning a binary file of the driver and modifying method calls of the binary file of the driver such that all kernel virtual memory addresses and physical memory addresses allocated for use by the driver is allocated from the non-relocatable regions;
    instructions for causing one or more processors, in response to a request to free the physical memory allocated for use by a particular driver of the plurality of drivers, to perform particular steps comprising:
        (c) determine which kind of region a particular virtual address associated with the physical memory references in the kernel virtual memory address space, wherein said kind is either relocatable or non relocatable; and (d) freeing said allocated physical memory from the appropriate region based upon the kind.

9. The machine readable storage medium of claim 8, wherein the list comprises data accessed by a kernel during startup of the computer system.

10. The machine readable storage medium of claim 8, wherein the instructions for causing one or more processors to scan a binary file of the driver and modify method calls of the binary file of the driver further comprise:

instructions for causing one or more processors to identify a first method used by the driver that causes relocatable physical memory to be allocated;

instructions for causing one or more processors, in response to the first method being called, to cause the call to be redirected to a second method, wherein the second method causes non-relocatable physical memory to be allocated.

11. The machine readable storage medium of claim 10, wherein the instructions for causing one or more processors to cause the call to be redirected to a second method further comprise instructions for causing one or more processors to replace references to the first method in a symbol table accessed by the kernel.

12. The machine readable storage medium of claim 10, wherein the instructions for causing one or more processors to cause the call to be redirected to a second method further comprise instructions for causing one or more processors to change a first memory address associated with the first method to a second memory address associated with the second method.

13. The machine readable storage medium of claim 8, wherein the method calls are associated with callback handlers.

14. The machine readable storage medium of claim 8, wherein the instructions for causing one or more processors to determine which kind of region a particular virtual address associated with the physical memory references in the kernel virtual memory address space further comprise:

instructions for causing one or more processors to compare the particular virtual address with a first value, wherein the first value is initialized at startup and is accessed by the kernel; and instructions for causing one or more processors to, based on the comparison, identify the particular virtual address as referencing the relocatable or non-relocatable region of kernel virtual memory address space.

15. An apparatus for memory management, comprising:

a machine-readable storage medium carrying one or more sequences of instructions; and one or more processors, wherein execution of the one or more sequences of instructions by the one or more processors causes:

logically partitioning physical memory and kernel virtual memory address space of a computer system into relocatable and non-relocatable regions;

for each driver of a plurality of drivers being loaded into the computer system, performing particular steps comprising:

(a) determining whether the driver is located in a list; and (b) if the driver is located in the list, scanning a binary file of the driver and modifying method calls of the binary file of the driver such that all physical memory allocated for use by the driver is allocated from non-relocatable physical memory;

in response to a request to free the physical memory allocated for use by a particular driver of the plurality of drivers, performing particular steps comprising;

(c) determining which kind of region a particular virtual address associated with the physical memory references in the kernel virtual memory address space, wherein said kind is either relocatable or non-relocatable; and (d) freeing said allocated physical memory and kernel virtual memory address space from the appropriate region based upon the kind.

16. The apparatus of claim 15, wherein the list comprises data accessed by a kernel during startup of the computer system.

17. The apparatus of claim 15, wherein the one or more sequences of instructions further comprises instructions which, when executed by the one or more processors, cause:

identifying a first method used by the driver that causes relocatable physical memory to be allocated;

in response to the first method being called, causing the call to be redirected to a second method, wherein the second method causes non-relocatable physical memory to be allocated.

18. The apparatus of claim 17, wherein the one or more sequences of instructions further comprises instructions which, when executed by the one or more processors, cause the call to be redirected to a second method comprises replacing references to the first method in a symbol table accessed by the kernel.

19. The apparatus of claim 17, wherein the one or more sequences of instructions further comprises instructions which, when executed by the one or more processors, cause the call to be redirected to a second method comprises changing a first memory address associated with the first method to a second memory address associated with the second method.

20. The apparatus of claim 15, wherein the method calls are associated with callback handlers.

21. The apparatus of claim 15, wherein the one or more sequences of instructions further comprises instructions which, when executed by the one or more processors, cause:

comparing the particular virtual address with a first value, wherein the first value is initialized at startup and is accessed by the kernel;

based on the comparison, identifying the particular virtual address as referencing the relocatable or non-relocatable region of kernel virtual memory address space.

\* \* \* \* \*

UNITED STATES PATENT AND TRADEMARK OFFICE
CERTIFICATE OF CORRECTION

| | |
|---|---|
| PATENT NO. | : 7,472,249 B2 |
| APPLICATION NO. | : 11/479750 |
| DATED | : December 30, 2008 |
| INVENTOR(S) | : Cholleti et al. |

It is certified that error appears in the above-identified patent and that said Letters Patent is hereby corrected as shown below:

COLUMN 14
Claim 8: Line 66, delete "determine" and insert --determining--

Signed and Sealed this

Third Day of March, 2009

JOHN DOLL
*Acting Director of the United States Patent and Trademark Office*